Feb. 23, 1965  E. T. STROM  3,170,718
NON-SWAY CLEVIS STRUCTURE
Filed Jan. 8, 1963
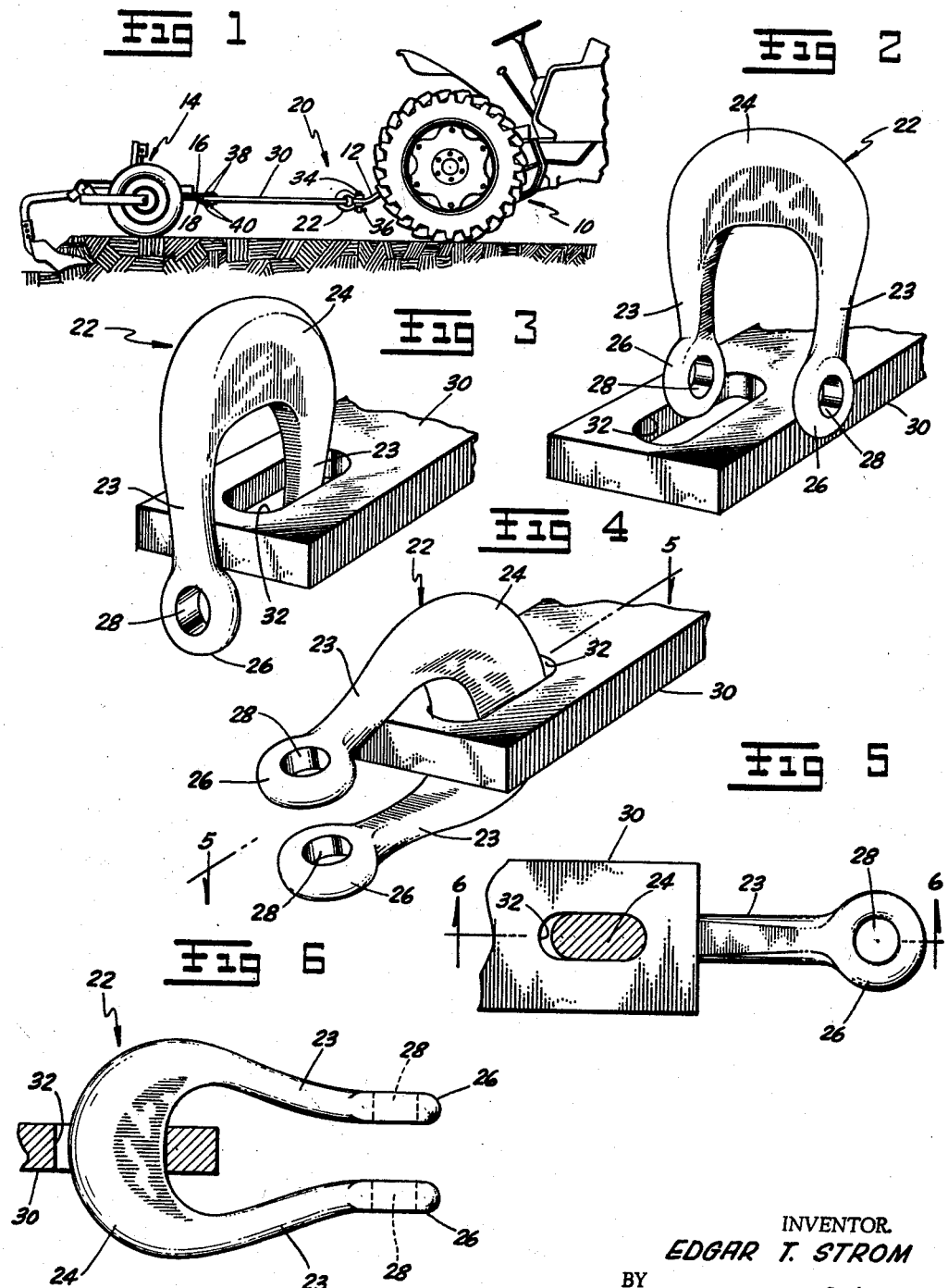
INVENTOR.
EDGAR T. STROM
BY
Meyer & Peterson
ATTORNEYS

United States Patent Office 3,170,718
Patented Feb. 23, 1965

3,170,718
NON-SWAY CLEVIS STRUCTURE
Edgar Thurston Strom, Beulah, N. Dak.
Filed Jan. 8, 1963, Ser. No. 250,122
5 Claims. (Cl. 280—504)

This invention relates generally to clevises, and pertains more particularly to a clevis structure limited as to its freedom of movement.

One object of the invention is to provide a clevis structure that will prevent swaying or twisting in one plane yet permitting such movement to occur in a plane penpendicular thereto. While the invention will find utility in various situations, it will have especial usefulness in towing farm implements and the like where relative vertical movement is desirable and lateral or side sway is to be avoided. More specifically, the invention has for an aim the provision of a clevis formed with a bight having an elongated cross section which is received in a similarly configured aperture located adjacent one end of a hitch member or the like.

Another object of the invention is to afford facile engagement and disengagement of the clevis with respect to the hitch member.

Another object of the invention is to provide a clevis structure that can be fabricated at a relatively low cost, the cost being little or no greater than that for conventional clevises.

Still further, the invention has for an object the provision of a clevis structure that will be rugged and not apt to break readily.

Yet another object is to provide a clevis structure that when used in towing operations will permit angularity to occur in a vertical plane, thereby preventing the tractor from tipping over backward.

These and other objects and advantages of the invention will more fully appear from the following description:

FIGURE 1 is a side elevational view showing my clevis structure in actual use behind a tractor which is towing a farm implement;

FIGURE 2 is a perspective view of the invention in an exploded or separated condition, the view showing the clevis about to be inserted into the elongated slot of a hitch member;

FIGURE 3 is a view corresponding to FIGURE 2 but with the free end of one of the leg portions of the clevis actually inserted into the slot, the clevis having been turned through 90 degrees from the position in which it appears in FIGURE 2;

FIGURE 4 is a perspective view of the clevis structure as actually used in FIGURE 1;

FIGURE 5 is a sectional view taken in the direction of line 5—5 of FIGURE 4 for the purpose of showing the cross sectional configuration of the bight of the clevis with respect to the slot in which said bight is normally received, and FIGURE 6 is a sectional view taken in the direction of line 6—6 of FIGURE 5.

Referring first to FIGURE 1, the vehicle that is used for towing purposes has been illustrated as a tractor and the rear end thereof has been generally denoted by the reference numeral 10. The only accessory or part of the tractor that warrants specific mention is the rearwardly directed drawbar labeled 12 which has a vertically oriented aperture adjacent its rear end. While any number of farm implements may be pulled, a cultivator or plow 14 has been pictured and has a forwardly extending tongue 16 terminating in a forked end 18 provided with two pairs of aligned apertures for a purpose later described.

The clevis structure itself which constitutes the present invention has been generally designated by the reference numeral 20. An important part of the clevis structure 20 is a clevis or U-shaped member 22 having leg portions 23 of generally circular cross section, although the opposed faces can be flattened somewhat (see FIGURE 5) if the diameter is sufficiently small, and a bight portion 24 of oblong or elliptical cross section. Actually, the bight can be more generally rectangular than that shown, but it is highly important that the cross section be elongated (best seen in FIGURE 5). The free ends of the leg portions 23 have been indicated by the reference numeral 26 and it will be discerned that they are of annular configuration to provide aligned apertures 28.

The clevis structure 20 in the exemplary situation also includes a rectangular strip which constitutes a hitch member 30. The strip 30 has formed adjacent one end thereof an elongated aperture or slot 32. From FIGURE 5, it will be seen that the length of the slot 32 is slightly longer than the major axis of the bight 24. On the other hand, the width of the slot is only slightly greater than the minor axis of the bight portion 24, there being only enough clearance to permit relative movement. However, the substantial correspondence of shape and size prevents the bight portion 24 from twisting within the confines of the slot 32 because the side walls of the slot 32 prevent such an occurrence. Although the leg portions 23 have been mentioned as having a circular cross section or at least being substantially circular in cross section, it can now be explained that the diameter of the leg portions 23 is somewhat smaller than the width of the slot 32. It can also be understood that the outside or external diameter of the annular ends 26 is less than the length of the slot 32, whereas the thickness of the annular ends 26 is only slightly less than the width of said slot 32. The manner of engaging the clevis or U-shaped member 22 with the hitch or strip 30 will presently be described and this proportioning will then be better comprehended.

At this time, though, it will be noted that the clevis 22 is connected to the rear end of the drawbar 12 through the agency of a pin 34 which is prevented from becoming dislodged by a cotter pin 36 that extends diametrically through its lower end. However, the cotter pin 36 can be easily removed so that the pin 34 can be likewise removed. The other end of the hitch or strip 30 is received in the fork 18 of the tongue 16 and a pair of bolts 38 extend downwardly through the two previously mentioned apertures provided in the strip 30, the lower end having affixed thereto a pair of nuts 40.

Having presented the foregoing information, the manner in which my clevis structure is assembled and functions will now be described. With the clevis or U-shaped member 22 oriented as shown in FIGURE 2, the left end 26 can be lowered into the slot 32. This is possible by reason of the thickness of the ends 26 being somewhat less than the width of the slot 32. When the clevis 22 is lowered to the extent shown in FIGURE 3, it follows that the clevis can be rotated or turned 90 degrees from the position in which it is illustrated in FIGURE 2. The rotated or turned relationship is that actually pictured in FIGURE 3. Having progressed to this stage, it should be manifest that the clevis 22 can be then moved into the position depicted in FIGURE 4. This is the relative position in which the clevis structure 20 actually functions. As earlier pointed out, the bight portion 24, owing to the fact that it possesses an elongated cross section, will not twist within the confines of the slot 32. While the twisting of the clevis 22 to either side is prevented by the side walls of the slot 22, nonetheless, vertical movement is possible inasmuch as the bight portion 24 will swivel or pivot up and down in a vertical plane.

This action should be readily understood from the relationship presented in FIGURE 6.

Hence, in the case at hand, where the implement 14 may be pulled over rough and irregular terrain, even in some instances through highway ditches, there can be some vertical movement at the forward end of the hitch member 30 by virtue of the way in which the bight portion 24 is received in the slot 32. However, the tendency for the implement 14 to sway, as with conventional clevises, is severely limited by reason of the restriction afforded by the side walls of the elongated aperture or slot 32. In other words, the oblong configuration of the bight portion 24 with respect to the slot 32 prevents the twisting of the clevis 22 in a horizontal plane, even though there can be a relative movement or twisting of the clevis 22 in a vertical plane. For example, the forward end of the cultivator 14 may very well move up and down as it is towed over the field, especially if the field is rough, and such movement can occur without restriction, yet undesired lateral sway is prevented, as already explained.

One thing that should be understood is that the hitch or strip 30 has been shown in a very simple form. Actually, the hitch may constitute a variety of designs, it only being necessary that a strip-like forward end be available for containing the elongated slot 32 into which the bight portion 24 is received. By the same token, the tongue 16 and its forked end 18 is only illustrative as it can assume a variety of designs. Still further, the particular implement 14 that has been depicted is of simple construction and therefore is more readily pictured; many different implements and other devices can be towed, though. Actually, the clevis structure 20 is not even limited to towing operations as it can be used with hoists and the like where swaying in one direction is to be avoided.

It will, of course, be understood that various changes may be made in the form, details, arrangement and proportions of the parts without departing from the scope of my invention as set forth in the appended claims.

What is claimed:

1. A clevis structure comprising:
   (a) a generally U-shaped member having leg portions and being formed with a bight having an elongated transverse cross section, the major axis of said bight lying along a certain plane, the free ends of said leg portions having a pair of substantially aligned pin receiving apertures therein, the common axis taken through said apertures being substantially within said certain plane,
   (b) a cooperable member having an elongated aperture extending therethrough for the reception of said bight,
   (c) whereby the side walls of said aperture prevent the bight from twisting therein.

2. A clevis structure in accordance with claim 1 in which:
   (a) said aperture is substantially the same size and shape as the cross section of said bight.

3. A clevis structure in accordance with claim 1 in which:
   (a) said aperture and the cross section of said bight are oval.

4. A clevis structure comprising:
   (a) a generally U-shaped member including leg portions having a generally circular cross section and a bight portion having an oblong cross section, the free ends of said leg portions having a pair of substantially aligned pin receiving apertures therein, the common axis taken through said apertures lying along a certain plane, the minor axis of said oblong cross section being substantially equal to the diameter of said leg portions and the major axis thereof being greater than said diameter and lying along said certain plane, and
   (b) a flat strip provided with a slot therein having a width slightly larger than the minor axis of said oblong cross section and having a length slightly longer than said major axis,
   (c) whereby the side walls of said slot prevent the bight from twisting therein.

5. A clevis structure comprising:
   (a) a generally U-shaped member including leg portions having a generally circular cross section and a bight portion having an oblong cross section, the minor axis of said oblong cross section being substantially equal to the diameter of said leg portions and the major axis thereof being greater than said diameter,
   (b) a flat strip provided with a slot therein having a width slightly larger than the minor axis of said oblong cross section and having a length slightly longer than said major axis,
   (c) whereby the side walls of said slot prevent the bight from twisting therein, and
   (d) the free ends of said leg portions have an annular configuration forming aligned pin receiving apertures with the outer diameter of said ends being less than the length of said slot and the thickness thereof being less than the width of said slot.

References Cited in the file of this patent

UNITED STATES PATENTS

| | | |
|---|---|---|
| 448,880 | Hansen | Mar. 24, 1891 |
| 506,790 | Mutchenbacker | Oct. 17, 1893 |
| 1,488,744 | Ekberg | Apr. 1, 1924 |
| 2,490,218 | Kirby et al. | Dec. 6, 1949 |